US012770564B2

(12) United States Patent
Kim et al.

(10) Patent No.: US 12,770,564 B2
(45) Date of Patent: Oct. 20, 2026

(54) DISPLAY DEVICE

(71) Applicant: LG Display Co., Ltd., Seoul (KR)

(72) Inventors: Hyeongkyu Kim, Paju-si (KR); YunSung Yang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/057,704

(22) Filed: Feb. 19, 2025

(65) Prior Publication Data

US 2025/0265996 A1 Aug. 21, 2025

(30) Foreign Application Priority Data

Feb. 20, 2024 (KR) ........................ 10-2024-0024355

(51) Int. Cl.

| | |
|---|---|
| ***G09G 5/00*** | (2006.01) |
| ***G09G 3/32*** | (2016.01) |
| ***G09G 3/3233*** | (2016.01) |

(52) U.S. Cl.

CPC ............. *G09G 3/3233* (2013.01); *G09G 3/32* (2013.01); *G09G 2320/0233* (2013.01); *G09G 2320/0271* (2013.01); *G09G 2330/028* (2013.01)

(58) Field of Classification Search

CPC ................... G09G 3/3233; G09G 3/32; G09G 2320/0233; G09G 2320/0271; G09G 2330/028

USPC .......................................................... 345/204

See application file for complete search history.

(56) References Cited

U.S. PATENT DOCUMENTS

| | | | | |
|---|---|---|---|---|
| 2013/0154408 A1* | 6/2013 | Satou | B60L 50/61 310/61 |
| 2018/0211579 A1* | 7/2018 | Bae | G09G 3/2003 |
| 2020/0111423 A1* | 4/2020 | Orio | G09G 3/3225 |
| 2020/0211457 A1* | 7/2020 | Kim | G09G 3/3233 |
| 2021/0074201 A1* | 3/2021 | Han | G09G 3/2092 |
| 2021/0090524 A1* | 3/2021 | In | G09G 5/10 |

FOREIGN PATENT DOCUMENTS

| | | |
|---|---|---|
| KR | 10-2020-0082744 A | 7/2020 |
| KR | 10-2023-0066873 A | 5/2023 |

* cited by examiner

*Primary Examiner* — Jennifer T Nguyen

(74) *Attorney, Agent, or Firm* — Birch, Stewart, Kolasch & Birch, LLP

(57) ABSTRACT

A display device can include a display panel having a plurality of pixels, and a luminance compensating unit. The luminance compensating unit can adjust a gamma voltage according to a difference between a first high potential voltage and a second high potential voltage. The first high potential voltage can be supplied to a pixel that is the most adjacent to one side of the display panel, among the plurality of pixels. The second high potential voltage can be supplied to a pixel that is the most adjacent to another side of the display panel, among the plurality of pixels.

10 Claims, 5 Drawing Sheets

DISPLAY DEVICE

CROSS-REFERENCE TO RELATED APPLICATIONS

This application claims priority to Korean Patent Application No. 10-2024-0024355 filed on Feb. 20, 2024, in the Korean Intellectual Property Office, the entire contents of which are hereby expressly incorporated by reference into the present application.

BACKGROUND

Field

The present disclosure relates to a display device, and more particularly, for example, without limitation, to a display device with an improved display quality.

Discussion of the Related Art

As the technology in modern society develops, display devices are used in various ways to provide information to users. The display devices are included in not only electronic signs which simply transmit visual information in one direction, but also various electronic devices which require a higher level of technology to check user's input and provide information in response to the checked input.

A representative display device can include a liquid crystal display device (LCD), a field emission display device (FED), an electro-wetting display device (EWD), and an organic light emitting display device (OLED).

Among them, the organic light emitting display device is a self-emitting display device so that a separate light source is not necessary, which is different from the liquid crystal display device. Therefore, the organic light emitting display device can be manufactured to have a light weight and a small thickness. Further, since the organic light emitting display device is advantageous not only in terms of power consumption due to the low voltage driving, but also in terms of color implementation, a response speed, a viewing angle, and a contrast ratio (CR), it is expected to be utilized in various fields.

The description provided in the description of the related art section should not be assumed to be prior art merely because it is mentioned in or associated with the description of the related art section. The description of the related art section can include information that describes one or more aspects of the subject technology, and the description in this section does not limit the invention.

SUMMARY OF THE DISCLOSURE

The inventors have recognized that, in related art, there is limitation on display performance of a display device.

Accordingly, an object to be achieved by the present disclosure is to provide a display device with an improved display quality.

An object to be achieved by the present disclosure is to provide a display device which compensates for a luminance difference according to a voltage drop without affecting a pixel driving stability and a power voltage supplied to a pixel.

Objects of the present disclosure are not limited to the above-mentioned objects, and other objects, which are not mentioned above, can be clearly understood by those skilled in the art from the following descriptions.

A display device according to an example embodiment of the present disclosure includes a display panel in which a plurality of pixels is disposed and a luminance compensating unit which adjusts a gamma voltage according to a difference of a first high potential voltage supplied to a pixel that is the most adjacent to one side of the display panel, among the plurality of pixels, and a second high potential voltage supplied to a pixel that is the most adjacent to another side of the display panel, among the plurality of pixels.

A display device according to another example embodiment of the present disclosure includes a display panel in which a plurality of pixels is disposed, a data driver which supplies a data voltage to the plurality of pixels through a plurality of data lines, according to a gamma voltage, and a luminance compensating unit which adjusts the gamma voltage according to a difference of a first high potential voltage supplied to a pixel disposed in a first pixel line, among the plurality of pixels, and a second high potential voltage supplied to a pixel disposed in a last pixel line, among the plurality of pixels.

Other detailed matters of the example embodiments of the present disclosure are included in the detailed description and the drawings.

According to aspects of the present disclosure, a voltage drop amount is detected in real time to reduce a luminance deviation and improve a display quality.

According to aspects of the present disclosure, a data voltage is adjusted according to a voltage drop amount to compensate for a luminance difference according to the voltage drop without affecting the pixel driving stability and a power voltage supplied to a pixel.

The effects according to the present disclosure are not limited to the contents exemplified above, and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

Figure 1:
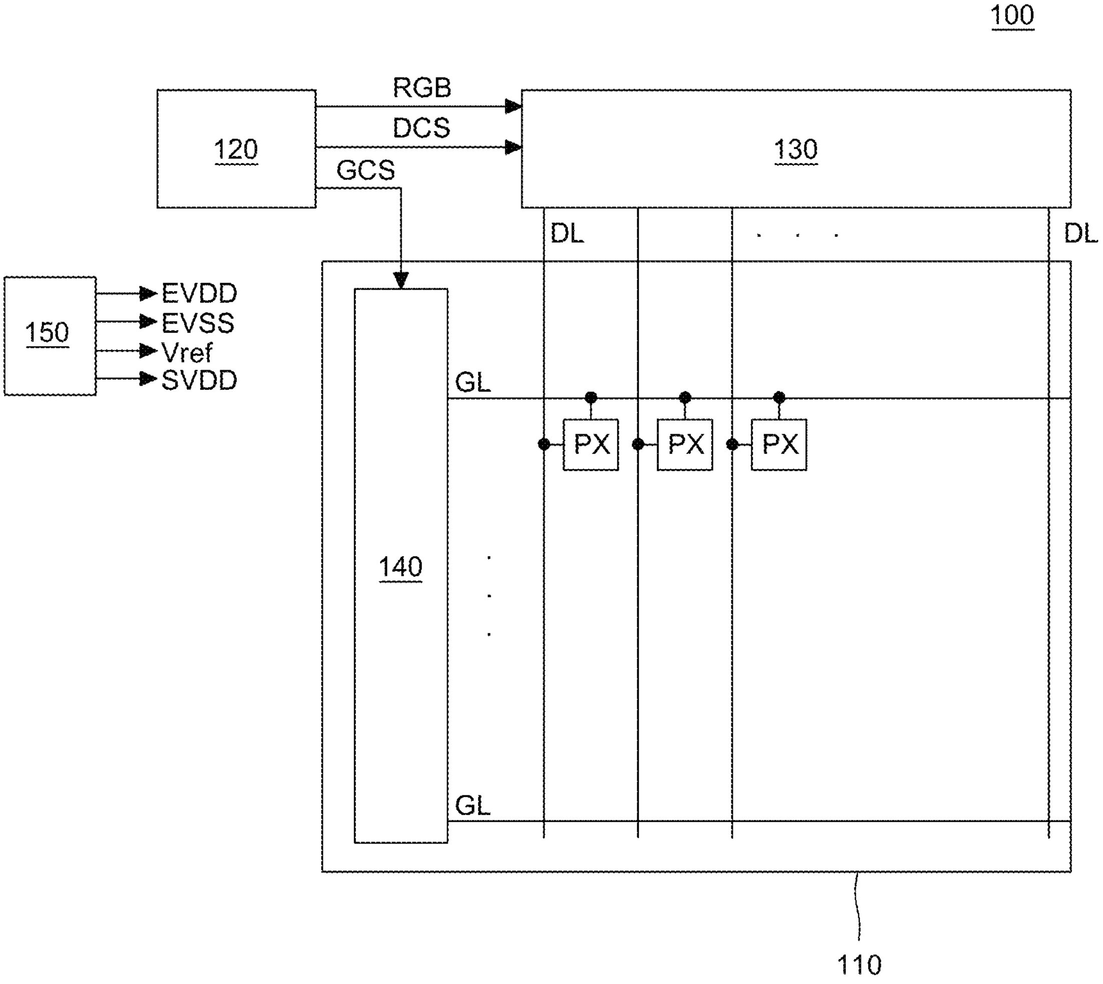
FIG. 1 is a functional block diagram of a display device according to an example embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, dimensions (e.g., length, width, height, thickness, radius, diameter, area, etc.), ratios, angles, numbers, and the like illustrated in the accompanying drawings for describing the example embodiments of the present disclosure are merely examples, and the present disclosure is not limited thereto. Like reference numerals generally denote like elements throughout the disclosure. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

Components are interpreted to include an ordinary error range even if not expressly stated.

When the position relation between two parts is described using the terms such as "on", "above", "over", "below", and "next", one or more parts can be positioned between the two parts unless the terms are used with the term "immediately" or "directly".

Spatially relative terms, such as "under," "below," "beneath", "lower," "over," "upper" and the like, can be used herein for ease of description to describe one element or feature's relationship to another element(s) or feature(s) as illustrated in the figures. It will be understood that the spatially relative terms can encompass different orientations of an element in use or operation in addition to the orientation depicted in the figures. For example, if an element in the figures is inverted, elements described as "below" or "beneath" other elements or features would then be oriented "over" the other elements or features. Thus, the example term "below" can encompass both an orientation of below and above. Similarly, the example term "above" or "over" can encompass both an orientation of "above" and "below".

In describing temporal relationship, terms such as "after," "subsequent to," "following," "next," "before," and the like can include cases where any two events are not consecutive, unless the term such as "immediately" "just" or "directly" is explicitly used.

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components, and may not define order or sequence. Therefore, a first component to be mentioned below can be a second component in a technical concept of the present disclosure.

In addition, terms, such as first, second, A, B, (a), (b), or the like can be used herein when describing components of the present disclosure. Each of these terminologies is not used to define an essence, order, or sequence of a corresponding component but used merely to distinguish the corresponding component from other components. In the case that it is described that a certain structural element or layer is "connected", "coupled", "adhered" or "joined" to another structural element or layer, it is typically interpreted that another structural element or layer can be "connected", "coupled", "adhered" or "joined" to the structural element or layer directly or indirectly.

It should be understood that the term "at least one" includes all combinations related with any one item. For example, "at least one among a first element, a second element and a third element" can include all combinations of two or more elements selected from the first, second and third elements as well as each element of the first, second and third elements.

A term "device" used herein can refer to a display device including a display panel and a driver for driving the display panel. Examples of the display device can include a light emitting element, and the like. In addition, examples of the device can include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including light emitting element and the like, but embodiments of the present disclosure are not limited thereto.

Like reference numerals generally denote like elements throughout the disclosure. Further, the term "can" fully encompasses all the meanings and coverages of the term "may."

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

Hereinafter, example embodiments of the present disclosure will be described in detail with reference to accompanying drawings. All the components of each display device according to all embodiments of the present disclosure are operatively coupled and configured.

FIG. 1 is a functional block diagram of a display device according to an example embodiment of the present disclosure.

Referring to FIG. 1, a display device 100 according to the example embodiment of the present disclosure includes a display panel 110, a timing controller 120, a data driver 130, a gate driver 140, and a power source unit 150.

In the display panel 110, a plurality of pixels PX can be disposed to display images.

In the display panel 110, a plurality of gate lines GL disposed in a first direction and a plurality of data lines DL disposed in a second direction which is different from the first direction can be disposed. The plurality of gate lines GL and the plurality of data lines DL can intersect and the plurality of pixels PX can be disposed in a matrix.

The plurality of pixels PX can be electrically connected to the plurality of gate lines GL and the plurality of data lines DL. Therefore, a gate signal and a data voltage can be supplied to each pixel PX through the gate lines GL and the data lines DL. Each pixel PX implements a gray scale by the gate signal and the data voltage to display the image on the display panel 110.

Each of the plurality of pixels PX can include a red sub pixel, a green sub pixel, a blue sub pixel, and a white sub pixel. The red sub pixel, the green sub pixel, the blue sub pixel, and the white sub pixel can configure one unit sub pixel to implement color. Colors implemented in the unit sub pixel can be determined according to an emission ratio of the red sub pixel, the green sub pixel, the blue sub pixel, and the white sub pixel. In the meantime, the white sub pixel can be omitted in the unit sub pixel. A data line DL and a gate line GL can be connected to each of the plurality of pixels PX.

Each of the plurality of pixels PX can include a driving transistor and a plurality of switching transistors. The plurality of pixels PX can be supplied with a first power voltage EVDD (for example, a high potential power voltage), a second power voltage EVSS (for example, a low potential power voltage), and a third power voltage Vref (for example, a reference voltage).

A voltage level of the second power voltage EVSS can be lower than a voltage level of the first power voltage EVDD. For example, the first power voltage EVDD can be a positive voltage and the second power voltage EVSS can be a negative voltage.

The third power voltage Vref is an initialization voltage to initialize a pixel PX and for example, a driving transistor and/or a light emitting diode included in the pixel PX can be initialized by the initialization voltage.

In the example embodiment of the present disclosure, signal lines connected to the pixel PX can be set in various forms in accordance with a circuit structure of the pixel PX.

The timing controller 120 can be supplied with image data and an input control signal from a host system, such as an application processor (AP), through a predetermined interface. The timing controller 120 can control driving timings of the data driver 130 and the gate driver 140.

The timing controller 120 can generate a gate control signal GCS and a data control signal DCS based on the image data and the input control signal. For example, the input control signal can include a vertical synchronization signal, a horizontal synchronization signal, a data enable signal, and a clock signal. The gate control signal GCS can be supplied to the gate driver 140 and the data control signal DCS can be supplied to the data driver 130. The timing controller 120 realigns image data supplied from the host system to generate data RGB and supply the data RGB to the data driver 130.

The data driver 130 can receive a data control signal DCS and image data RGB from the timing controller 120. The data driver 130 can convert digital image data RGB into an analog data voltage. The data driver 130 can supply a data voltage to the plurality of data lines DL in response to the data control signal DCS. At this time, the data voltage which is supplied to the plurality of data lines DL can be supplied to be synchronized with a gate signal which is supplied to the plurality of gate lines GL. The data voltage can be a value corresponding to a gray scale to be expressed by the pixel. The data driver 130 can be configured by a plurality of driver ICs.

The data driver 130 can be connected to the bonding pad of the display panel 110 in a chip on glass (COG) manner or can be directly disposed on the display panel 110. In some cases, the data driver 130 can be disposed to be integrated with the display panel 110. Further, the data driver 130 can be disposed in a chip on film (COF) manner.

The gate driver 140 can generate a scan signal and an emission signal based on the gate control signal GCS. The gate driver 140 can include a scan driver and an emission signal driver.

The scan driver generates a scan signal in a row sequential manner to drive at least one scan line connected to each pixel row to supply the scan signal to the scan lines. For example, the scan driver can supply a first scan signal and a second scan signal. The first and second scan signals can be set to a gate-on voltage corresponding to a type of a transistor to which the scan signals are supplied. The transistor which receives the scan signal can be set to a turn-on state when the scan signal is supplied. For example, a gate-on voltage of a scan signal supplied to a P-channel metal oxide semiconductor (PMOS) transistor can be a logic low level and a gate-on voltage of a scan signal supplied to an N-channel metal oxide semiconductor (NMOS) transistor can be a logic high level. Hereinafter, the meaning of "scan signal being supplied" can be understood as the scan signal being supplied at a logic level which turns on the transistor controlled by the scan signal.

The emission signal driver generates an emission signal in a row sequential manner to drive at least one emission signal line connected to each pixel row to supply the emission signal to the emission signal lines.

The emission signal can be set to a gate-off voltage. A transistor which receives the emission signal can be set to be turned off when the emission signal is supplied and to be a turn-on state in the other cases. Hereinafter, the meaning of "emission signal being supplied" can be understood as the emission signal being supplied at a logic level which turns off the transistor controlled by the emission signal.

The power supply unit 150 can convert an input voltage supplied from an external system into a driving voltage required to drive the display device 100. For example, the power supply unit 150 converts the input voltage to output a source high potential voltage SVDD, a high potential voltage EVDD, a reference voltage Vref, and a low potential voltage EVSS. The source high potential voltage SVDD is a high potential power voltage which is applied to the luminance compensating unit of the data driver 130 which generates gamma voltages and can be supplied to the data driver 130. The high potential voltage EVDD, the reference voltage Vref, and the low potential voltage EVSS are voltages for driving the plurality of pixels PX and can be supplied to each of the plurality of pixels PX. In addition, the power supply unit 150 can generate a voltage required to drive the display device, such as a gate high voltage or a gate low voltage which is supplied to the gate driver 140. Hereinafter, a configuration of the plurality of pixels PX will be described in detail.

Figure 2:
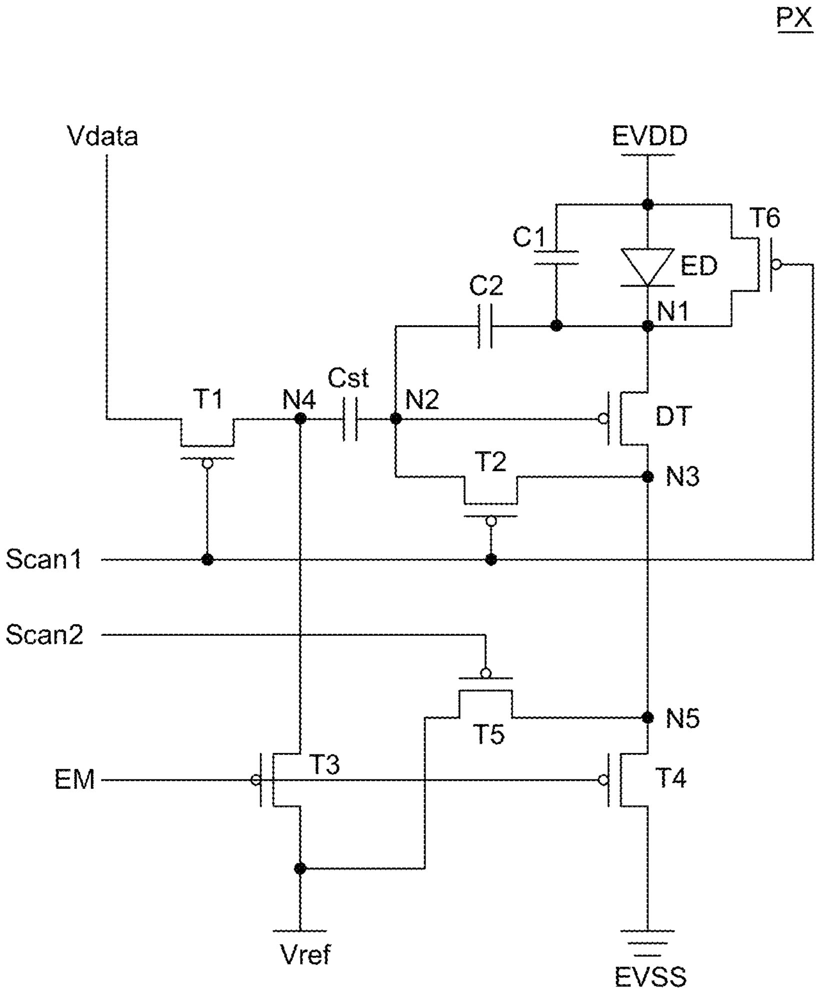
FIG. 2 is an example circuit diagram of a pixel of a display device according to an example embodiment of the present disclosure.

FIG. 2 is an example circuit diagram of a pixel of a display device according to an example embodiment of the present disclosure.

Referring to FIG. 2, the pixel PX can include a light emitting diode ED, a driving transistor DT, first to sixth transistors T1 to T6, a storage capacitor Cst, a first capacitor C1, and a second capacitor C2.

The light emitting diode ED can be connected between a high potential voltage line which supplies a high potential voltage EVDD and a first node N1. For example, a first electrode (for example, an anode electrode) of the light emitting diode ED can be connected to the high potential voltage line which supplies a high potential voltage EVDD. A second electrode (for example, a cathode electrode) of the light emitting diode ED can be connected to the first node N1 which corresponds to the source electrode of the driving transistor DT.

In the example embodiment of the present disclosure, the light emitting diode ED can be an organic light emitting diode including an organic emission layer. In another example embodiment, the light emitting diode ED can be an inorganic light emitting diode which is formed with an inorganic material, such as a micro light emitting diode (LED) or a quantum dot light emitting diode. In another example embodiment, the light emitting diode ED can be a light emitting diode composed of a composite of an organic material and an inorganic material.

In the meantime, even though in FIG. 2, it is illustrated that the pixel PX includes a single light emitting diode ED, according to another example embodiment, the pixel PX includes a plurality of light emitting diodes and the plurality of light emitting diodes can be connected in series, parallel, or serial-parallel. For example, as the light emitting diode ED, the plurality of light emitting diodes (for example, organic light emitting diodes and/or inorganic light emitting diodes) can be connected in series, parallel, or serial-parallel, between the high potential voltage line and the first node N1.

The driving transistor DT controls a driving current supplied to the light emitting diode ED in accordance with a source-gate voltage Vsg. The driving transistor DT can be connected between the first node N1 and the third node N3. For example, the first electrode (for example, a source electrode) of the driving transistor DT can be connected to the first node N1 and the second electrode (for example, a drain electrode) can be connected to the third node N3. Further, a gate electrode of the driving transistor DT can be connected to the second node N2. The driving transistor DT can control a driving current which flows from a high potential voltage line which supplies a high potential voltage EVDD to a low potential voltage line which supplies a low potential voltage EVSS via the light emitting diode ED, in response to the voltage of the second node N2, that is, the voltage of the gate electrode. To this end, the high potential voltage EVDD can be set to be higher than the low potential voltage EVSS. For example, the high potential voltage EVDD can be a positive voltage and the low potential voltage EVSS can be a negative voltage.

The first transistor T1 supplies a data voltage Vdata supplied from the data line DL to a fourth node N4 which is a first electrode of the storage capacitor Cst. The first transistor T1 can be connected between a data line DL to which the data voltage Vdata is supplied and the fourth node N4. For example, the first electrode (for example, the source electrode) of the first transistor T1 can be connected to the data line DL to which the data voltage Vdata is supplied and the second electrode (for example, the drain electrode) can be connected to the fourth node N4. Further, the gate electrode of the first transistor T1 can be connected to the first scan line to which a first scan signal Scan1 is supplied. When the first scan signal Scan1 is supplied to the first scan line, the first transistor T1 is turned on to electrically connect the data line and the fourth node N4.

The second transistor T2 diode-connects the gate electrode and the drain electrode of the driving transistor DT. The second transistor T2 can be connected between the second node N2 and the third node N3. For example, the first electrode (for example, a source electrode) of the second transistor T2 can be connected to the third node N3 and the second electrode (for example, a drain electrode) can be connected to the second node N2. Further, the gate electrode of the second transistor T2 can be connected to the first scan line to which the first scan signal Scan1 is supplied. When the first scan signal Scan1 is supplied to the first scan line, the second transistor T2 is turned on to electrically connect the second electrode and the gate electrode of the driving transistor DT. That is, a timing when the second electrode and the gate electrode of the driving transistor DT are connected can be controlled by the first scan signal Scan1. When the second transistor T2 is turned on, the gate electrode and the drain electrode of the driving transistor DT can be diode-connected to form diode connection.

The third transistor T3 applies a reference voltage Vref to the fourth node N4. The third transistor T3 can be connected between the fourth node N4 and the reference voltage line which supplies a reference voltage Vref. For example, the first electrode (for example, a source electrode) of the third transistor T3 can be connected to a reference voltage line and the second electrode (for example, a drain electrode) can be connected to the fourth node N4. Further, a gate electrode of the third transistor T3 can be connected to an emission signal line to which the emission signal EM is supplied. When the emission signal EM is supplied to the emission signal line, the third transistor T3 is turned on to apply the reference voltage Vref to the fourth node N4. For example, when the third transistor T3 is turned on based on the emission signal EM, the reference voltage Vref can be applied to the fourth node N4 which is the first electrode of the storage capacitor Cst and the second node N2 can maintain a constant voltage while the light emitting diode ED emits light.

The fourth transistor T4 forms a current path between the driving transistor DT and the light emitting diode ED. The fourth transistor T4 can be connected between the fifth node N5 and a low potential voltage line to which the low potential voltage EVSS is supplied. For example, the first electrode (for example, a source electrode) of the fourth transistor T4 can be connected to the fifth node N5 and the second electrode (for example, a drain electrode) can be connected to the low potential voltage line to which the low potential voltage EVSS is supplied. Further, the gate electrode of the fourth transistor T4 can be connected to the emission signal line. When the fourth transistor T4 is turned on based on the emission signal EM, the low potential voltage EVSS can be applied to the fifth node N5.

The fifth transistor T5 applies a reference voltage Vref to the fifth node N5. The fifth transistor T5 can be connected between the fifth node N5 and the reference voltage line which supplies a reference voltage Vref. For example, the first electrode (for example, a source electrode) of the fifth transistor T5 can be connected to the reference voltage line and the second electrode (for example, a drain electrode) can be connected to the fifth node N5. Further, the gate electrode of the fifth transistor T5 can be connected to the second scan line to which the second scan signal Scan2 is supplied. When the fifth transistor T5 is turned on based on the second scan signal Scan2, the reference voltage Vref can be applied to the fifth node N5 and the drain electrode of the driving transistor DT which is the fifth node N5 can be initialized to the reference voltage Vref.

The sixth transistor T6 applies a high potential voltage EVDD to the first node N1. The sixth transistor T6 can be connected between a high potential voltage line which supplies a high potential voltage EVDD and the first node N1. For example, the first electrode (for example, a source electrode) of the sixth transistor T6 can be connected to the high potential voltage line and the second electrode (for example, a drain electrode) can be connected to the first node N1. Further, the gate electrode of the sixth transistor T6 can be connected to the first scan line to which the first scan signal Scan1 is supplied. When the sixth transistor T6 is turned on based on the first scan signal Scan1, the high potential voltage EVDD can be applied to the first node N1 and the light emitting diode ED can be suppressed from emitting light while the data voltage Vdata is applied to the fourth node N4. The storage capacitor Cst can store a voltage applied to the second node N2. The storage capacitor Cst can be connected between the fourth node N4 and the second node N2. The fourth node N4 can be connected to the reference voltage line. The storage capacitor Cst adjusts a voltage of the second node N2 according to a voltage applied to the fourth node N4 using a coupling characteristic to constantly maintain the driving current by fixing a voltage which is applied to the gate electrode of the driving transistor DT while the light emitting diode ED emits light.

The first capacitor C1 is connected between a high potential voltage line to which a high potential voltage EVDD is applied and the first node N1. For example, a first electrode of the first capacitor C1 can be connected to the high potential voltage line to which the high potential voltage EVDD is applied and a second electrode of the first capacitor C1 can be connected to the first node N1. The first capacitor C1 increases an intrinsic capacitance in the light emitting diode ED to emit light with higher luminance from the light emitting diode ED.

The second capacitor C2 is connected between the first node N1 and the second node N2. For example, the first electrode of the second capacitor C2 can be connected to the first node N1 and the second electrode of the second capacitor C2 can be connected to the second node N2. In the meantime, when a voltage can fluctuate in the fourth node N4, a voltage of the second node N2 can also fluctuate. At this time, the second capacitor C2 which is connected to the storage capacitor Cst in series is coupled to the storage capacitor Cst and a voltage of the fourth node N4 can be transmitted to the voltage of the second node N2 according to a capacitance ratio of the storage capacitor Cst and the second capacitor C2. Accordingly, a transfer rate of a data voltage from the fourth node N4 to the second node N2 can be lowered using the second capacitor C2. Further, when the light emitting diode ED is configured as a micro LED having a large slope of the I-V curve, the transfer rate of the data voltage Vdata is lowered using the second capacitor C2 to display more subtle gray scales.

In the meantime, the driving transistor DT, the first transistor T1, the second transistor T2, the third transistor T3, the fourth transistor T4, the fifth transistor T5, and the sixth transistor T6 can be formed by polysilicon semiconductor transistors. For example, the driving transistor DT, the first transistor T1, the second transistor T2, the third transistor T3, the fourth transistor T4, the fifth transistor T5, and the sixth transistor T6 can include polysilicon semiconductor layers formed by a low temperature poly-silicon (LTPS) process as active layers. Further, the driving transistor DT, the first transistor T1, the second transistor T2, the third transistor T3, the fourth transistor T4, the fifth transistor T5, and the sixth transistor T6 can be P-type transistors (for example, PMOS transistors). Therefore, a gate-on voltage which turns on the driving transistor DT, the first transistor T1, the second transistor T2, the third transistor T3, the fourth transistor T4, the fifth transistor T5, and the sixth transistor T6 can be a logic low level. The polysilicon semiconductor transistor has an advantage of fast response speed so that it can be applied to a switching element which requires fast switching, but it is not limited thereto.

Figure 3:
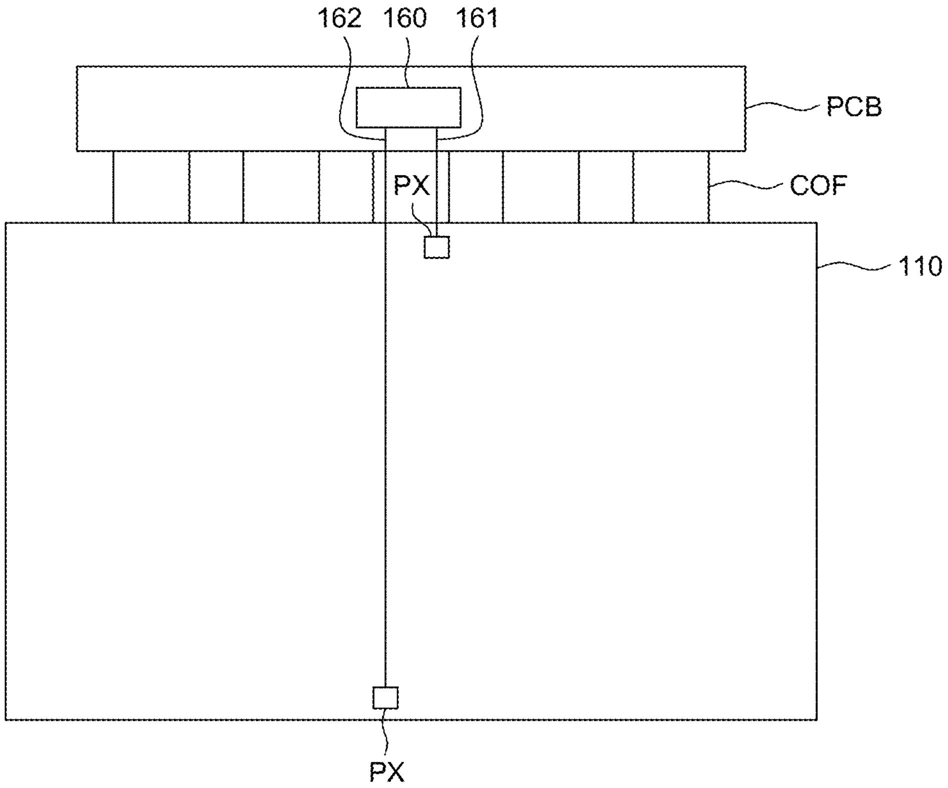
FIG. 3 is a schematic view of a display device according to an example embodiment of the present disclosure.

FIG. 3 is a schematic view of a display device according to an example embodiment of the present disclosure. For the convenience of description, in FIG. 3, among various components of the display device 100, only a display panel 110, a plurality of flexible films COF, a printed circuit board PCB, and a luminance compensating unit 160 are illustrated.

Referring to FIG. 3, the display device 100 includes a display panel 110, a plurality of flexible films COF, a printed circuit board PCB, and a luminance compensating unit.

In the display panel 110, a plurality of pixels PX for displaying images can be disposed. The plurality of pixels PX can be disposed on the display panel 110 in a row direction and a column direction and can be disposed in a matrix.

The plurality of flexible films COF can be disposed at one end of the display panel 110. The plurality of flexible films COF is films in which various components are disposed on a base film having a ductility to supply a voltage to the plurality of pixels PX and can be electrically connected to the display panel 110.

In the meantime, a driving IC, such as a driver IC, can be disposed on the plurality of flexible films COF. The driving IC is a component which processes data for displaying images and a driving signal for processing the data. The driving IC can be disposed in a chip on glass (COG), a chip on film (COF), or a tape carrier package (TCP) manner depending on a mounting method. However, for the convenience of description, it is described that the driving IC is mounted on the plurality of flexible films COF by a chip on film technique, but is not limited thereto. Further, the driving IC can be integrated with the timing controller to be disposed as a single chip.

The printed circuit board PCB is electrically connected to the plurality of flexible films COF. The printed circuit board PCB is a component which supplies signals to the driving IC. On the printed circuit board PCB, various components for supplying various signals to the driving IC can be disposed. In the meantime, even though it is illustrated in FIG. 3 that a plurality of flexible films COF is electrically connected to one printed circuit board PCB, the present disclosure is not limited thereto and a plurality of flexible films COF can be electrically connected to a plurality of printed circuit boards PCB, respectively.

The luminance compensating unit 160 can adjust a gamma voltage according to a difference between the first high potential voltage EVDD1 which is supplied to a pixel PX which is the most adjacent to one side of the display panel 110, among the plurality of pixels PX, and a second high potential voltage EVDD2 which is supplied to a pixel PX which is the most adjacent to the other side of the display panel 110, among the plurality of pixels PX.

The luminance compensating unit 160 is disposed on the printed circuit board PCB and can receive a high potential voltage EVDD from a pixel PX disposed on the display panel 110 through sensing lines 161 and 162 disposed on the printed circuit board PCB, the flexible film COF, and the display panel 110. However, the position where the luminance compensating unit 160 is disposed is not limited thereto and the luminance compensating unit 160 can be disposed on the flexible film COF. In this case, the sensing lines 161 and 162 can be disposed on the flexible film COF and the display panel 110. The luminance compensating unit 160 will be described in detail below with reference to FIGS. 4 and 5.

In the meantime, the sensing lines 161 and 162 include a first sensing line 161 and a second sensing line 162.

The first sensing line 161 is connected to the pixel PX which is the most adjacent to one side of the display panel 110, among the plurality of pixels PX, to transmit the supplied first high potential voltage EVDD1 to the luminance compensating unit 160.

For example, the first sensing line 161 is electrically connected to one pixel PX, among a plurality of pixels PX disposed to be adjacent to the plurality of flexible films COF, among the plurality of pixels PX disposed on the display panel 110, to transmit the first high potential voltage EVDD1 supplied to the pixel PX to the luminance compensating unit 160. For example, when a power supply unit which supplies a high potential voltage EVDD is disposed on the printed circuit board PCB and the high potential voltage EVDD is transmitted to the pixel PX of the display panel 110 through the high potential voltage line disposed on the plurality of flexible films COF, the first sensing line 161 can be connected to the pixel PX which is disposed in the most adjacent position to the plurality of flexible films COF.

For example, when the plurality of pixels PX is disposed in a row direction and a column direction on the display panel 110 and disposed in a matrix, the first sensing line 161 is electrically connected to one pixel PX, among a plurality of pixels PX disposed in a first column, to transmit the first high potential voltage EVDD1 supplied to the pixel PX to the luminance compensating unit 160.

The second sensing line 162 is connected to the pixel PX which is the most adjacent to the other side of the display panel 110, among the plurality of pixels PX, to transmit the supplied second high potential voltage EVDD2 to the luminance compensating unit 160.

For example, the second sensing line 162 is electrically connected to one pixel PX, among a plurality of pixels PX disposed in the most distant position from the plurality of flexible films COF, among the plurality of pixels PX disposed on the display panel 110, to transmit the second high potential voltage EVDD2 supplied to the pixel PX to the luminance compensating unit 160. For example, when a power supply unit which supplies a high potential voltage EVDD is disposed on the printed circuit board PCB and the high potential voltage EVDD is transmitted to the pixel PX of the display panel 110 through the high potential voltage line disposed on the plurality of flexible films COF, the second sensing line 162 can be connected to the pixel PX which is disposed in the most distant position from the plurality of flexible films COF.

For example, when the plurality of pixels PX is disposed in a row direction and a column direction on the display panel 110 and disposed in a matrix, the second sensing line 162 is electrically connected to one pixel PX, among a plurality of pixels PX disposed in the last column, to transmit the second high potential voltage EVDD2 supplied to the pixel PX to the luminance compensating unit 160.

Figure 4:
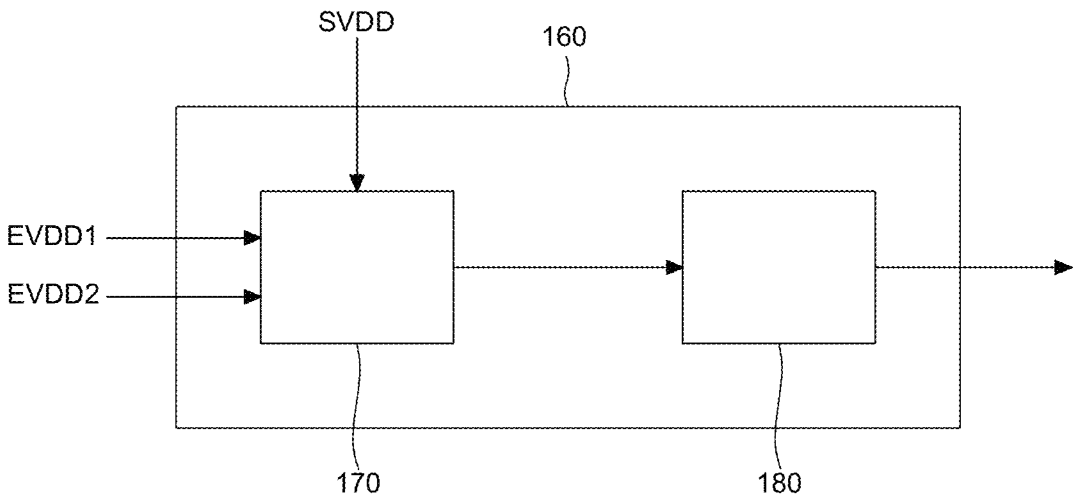
FIG. 4 is a block diagram of a luminance compensating unit of a display device according to an example embodiment of the present disclosure.
Figure 5:
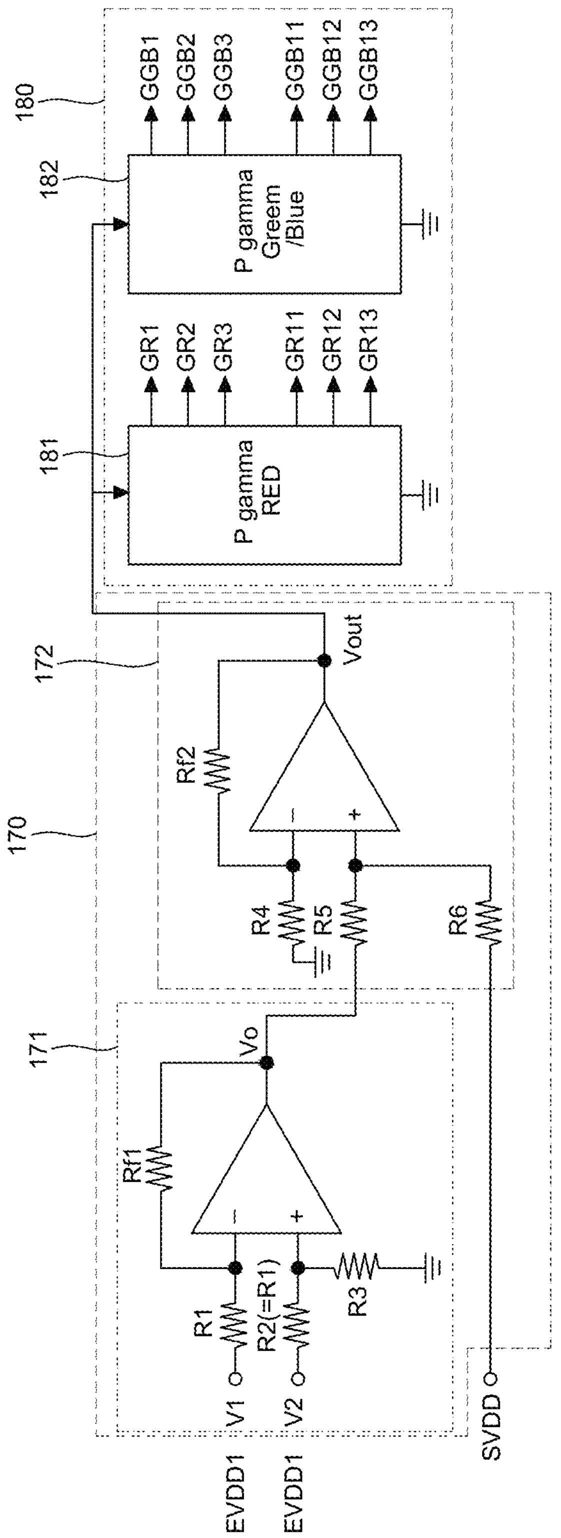
FIG. 5 is an example circuit diagram of a luminance compensating unit of a display device according to an example embodiment of the present disclosure.

FIG. 4 is a block diagram of a luminance compensating unit of a display device according to an example embodiment of the present disclosure. FIG. 5 is an example circuit diagram of a luminance compensating unit of a display device according to an example embodiment of the present disclosure.

Referring to FIGS. 4 and 5, the luminance compensating unit 160 includes a gamma driving voltage compensating unit 170 and a gamma voltage generating unit 180.

The gamma driving voltage compensating unit 170 outputs a compensated gamma driving voltage CVDD which is compensated according to a difference value between the first high potential voltage EVDD1 and the second high potential voltage EVDD2. For example, the gamma driving voltage compensating unit 170 is connected to the first sensing line 161 and the second sensing line 162 to compare the first high potential voltage EVDD1 and the second high potential voltage EVDD2 which are transmitted through the first sensing line 161 and the second sensing line 162. By doing this, the gamma driving voltage compensating unit 170 can derive the difference value. Here, the gamma driving voltage compensating unit 170 can output a source high potential voltage SVDD_C which is compensated according to the difference value between the first high potential voltage EVDD1 and the second high potential voltage EVDD2. The first high potential voltage EVDD1 and the second high potential voltage EVDD2 are high potential voltages which are supplied to the nearest pixel PX and the farthest pixel PX to and from the position where the high potential voltage is applied to derive a real-time voltage drop amount.

The gamma driving voltage compensating unit 170 includes a first amplifying unit 171 and a second amplifying unit 172. The first amplifying unit 171 amplifies a voltage drop amount and can be referred to as a voltage drop amount amplifying unit 171 and the second amplifying unit outputs a source high potential voltage according to the voltage drop amount and can be referred to as a source high potential voltage amplifying unit 172.

The voltage drop amount amplifying unit 171 amplifies and outputs the difference value between the first high potential voltage EVDD1 and the second high potential voltage EVDD2. The voltage drop amount amplifying unit 171 includes an inverting input terminal, a non-inverting input terminal, an output terminal, a first resistor R1, a second resistor R2, a third resistor R3, and a first feedback resistor Rf1.

The second high potential voltage EVDD2 is input to the non-inverting input terminal of the voltage drop amount amplifying unit 171. For example, in the voltage drop amount amplifying unit 171, the second resistor R2 and the third resistor R3 are connected between the second sensing line 162 to which the second high potential voltage EVDD2 is transmitted and the ground, in series, and the non-inverting input terminal of the voltage drop amount amplifying unit 171 can be connected between the second resistor R2 and the third resistor R3. Accordingly, in the voltage drop amount amplifying unit 171, the second high potential voltage EVDD2 can be input to the non-inverting input terminal via the second resistor R2 and the third resistor R3.

In the voltage drop amount amplifying unit 171, the first high potential voltage EVDD1 is input to the inverting input terminal of the voltage drop amount amplifying unit 171. For example, in the voltage drop amount amplifying unit 171, the first resistor R1 can be connected between the first sensing line 161 to which the first high potential voltage EVDD1 is transmitted and the inverting input terminal and the first feedback resistor Rf1 can be connected between the inverting input terminal and the output terminal.

Therefore, the voltage drop amount amplifying unit 171 amplifies a difference of the first high potential voltage EVDD1 and the second high potential voltage EVDD2 which are transmitted through the first sensing line 161 and the second sensing line 162 according to a ratio of the first resistor R1 and the first feedback resistor Rf1 to output a difference value.

The difference value Vo which is an output voltage of the voltage drop amount amplifying unit 171 is as represented in the following Equation 1.

$$Vo = -\left[\frac{R1}{Rf1}\right]EVDD1 + \left[1 + \frac{R1}{Rf1}\right]\left[R2 + \frac{R3}{R3}\right]EVDD2 \quad \text{[Equation 1]}$$

Here, when the first resistor R1 and the second resistor R2 have the same resistance and the first feedback resistor Rf1 and the third resistor R3 have the same resistance, the difference value Vo which is the output voltage of the voltage drop amount amplifying unit 171 is as represented in the following Equation 2.

$$Vo = \left[\frac{R1}{R3}\right](EVDD2 - EVDD1) \quad \text{[Equation 2]}$$

Therefore, the voltage drop amount amplifying unit 171 amplifies a difference of the second high potential voltage EVDD2 and the first high potential voltage EVDD1 according to a ratio of the first resistor R1 and the first feedback resistor Rf1 to output a difference value Vo.

The source high potential voltage amplifying unit 172 adds and amplifies the amplified difference value Vo to the source high potential voltage SVDD and outputs the compensated source high potential voltage Vout.

The source high potential voltage amplifying unit 172 includes an inverting input terminal, a non-inverting input terminal, an output terminal, a fourth resistor R4, a fifth resistor R5, a sixth resistor R6, and a second feedback resistor Rf2.

For example, the fourth resistor R4 can be connected between the inverting input terminal of the source high potential voltage amplifying unit 172 and the ground. The second feedback resistor Rf2 can be connected between the inverting input terminal of the source high potential voltage amplifying unit 172 and the output terminal of the source high potential voltage amplifying unit 172.

The difference value Vo and the source high potential voltage SVDD output from the voltage drop amount amplifying unit 171 can be input to the non-inverting input terminal of the source high potential voltage amplifying unit 172.

For example, the fifth resistor R5 can be connected between the non-inverting input terminal of the source high potential voltage amplifying unit 172 and the output terminal of the voltage drop amount amplifying unit 171. The difference value Vo output from the voltage drop amount amplifying unit 171 can be input to the non-inverting input terminal of the source high potential voltage amplifying unit 172 via the fifth resistor R5. Further, the sixth resistor R6 can be connected between the non-inverting input terminal of the source high potential voltage amplifying unit 172 and a source high potential voltage line to which the source high potential voltage SVDD is supplied. The source high potential voltage SVDD which is supplied to the source high potential voltage line can be input to the non-inverting input terminal of the source high potential voltage amplifying unit 172 via the sixth resistor R6.

Therefore, the source high potential voltage amplifying unit 172 adds the source high potential voltage SVDD which is input to the non-inverting input terminal, to the difference value Vo which is input to the non-inverting input terminal, to output a compensated source high potential voltage Vout.

The compensated source high potential voltage Vout which is an output voltage of the source high potential voltage amplifying unit 172 is as represented in the following Equation 3.

$$Vout = \left[1 + \frac{R4}{Rf2}\right]\left[\frac{R6}{R5 + R6}Vo + \frac{R5}{R5 + R6}SVDD\right] \quad \text{[Equation 3]}$$

Here, if the fourth resistor R4, the fifth resistor R5, the sixth resistor R6, and the second feedback resistor Rf2 have the same resistance, the compensated source high potential voltage Vout of the source high potential voltage amplifying unit 172 is as represented in the following Equation 4.

$$Vout = SVDD + Vo = SVDD + \left[\frac{R1}{R3}\right](EVDD2 - \cdot EVDD1) \quad \text{[Equation 4]}$$

Therefore, the source high potential voltage amplifying unit 172 adds the source high potential voltage SVDD which is input to the non-inverting input terminal, to the difference value Vo which is input to the non-inverting input terminal, to output a compensated source high potential voltage Vout.

The gamma voltage generating unit 180 outputs gamma voltages GR1 to GGB13 according to the compensated source high potential voltage Vout.

The gamma voltage generating unit 180 includes a first gamma voltage generating unit 181 and the second gamma voltage generating unit 182.

The first gamma voltage generating unit 181 can receive the compensated source high potential voltage Vout which is output from the source high potential voltage amplifying unit 172. The first gamma voltage generating unit 181 can output a gamma voltage according to the compensated source high potential voltage Vout. For example, the first gamma voltage generating unit 181 can be a programmable gamma IC (P-gamma IC) and can include a look-up table in which gamma data (gamma voltages having positive and negative gamma curve characteristics) is recorded and a digital-analog converter DAC which converts the gamma data into a gamma voltage. For example, the first gamma voltage generating unit 181 can receive the compensated source high potential voltage Vout which is output from the source high potential voltage amplifying unit 172 and generate a gamma voltage for a red sub pixel according to the compensated source high potential voltage Vout to output the gamma voltage to the data driver 130.

The second gamma voltage generating unit 182 can receive the compensated source high potential voltage Vout which is output from the source high potential voltage amplifying unit 172. The second gamma voltage generating unit 182 can output a gamma voltage according to the compensated source high potential voltage Vout. For example, the second gamma voltage generating unit 182 can be a programmable gamma IC (P-gamma IC) and can include a look-up table in which gamma data (gamma voltages having positive and negative gamma curve characteristics) is recorded and a digital-analog converter DAC which converts the gamma data into a gamma voltage. For example, the second gamma voltage generating unit 182 can receive the compensated source high potential voltage Vout which is output from the source high potential voltage amplifying unit 172 and generate gamma voltages for a green sub pixel and a blue sub pixel according to the compensated source high potential voltage Vout to output the gamma voltage to the data driver 130.

Accordingly, the display device 100 according to the example embodiment of the present disclosure detects a voltage drop amount in real time to adjust the data voltage Vdata according to the voltage drop amount. The display device supplies the high potential voltage and the data voltage for driving the pixel through a link line and a line configured by a metal pattern. At this time, there are problems in that the high potential voltage drop occurs due to the resistance on the supply line, resulting in the color additivity distortion and the luminance deviation. Accordingly, the display device 100 according to the example embodiment of the present disclosure outputs a compensated source high potential voltage Vout obtained by adding the source high potential voltage SVDD, to a difference value Vo of the first high potential voltage EVDD1 supplied to a pixel the most adjacent to one side of the display panel, among the plurality of pixels, and the second high potential voltage EVDD2 supplied to a pixel the most adjacent to the other side of the display panel. By doing this, the gamma voltage is adjusted to reduce the color additivity distortion and the luminance deviation due to the voltage drop and improve the display quality.

Further, the display device 100 according to the example embodiment of the present disclosure outputs a compensated source high potential voltage Vout obtained by adding the source high potential voltage SVDD to a difference value Vo of the first high potential voltage EVDD1 supplied to a pixel the most adjacent to one side of the display panel, among the plurality of pixels, and the second high potential voltage EVDD2 supplied to a pixel the most adjacent to the other side of the display panel. Further, the display device 100 outputs the gamma voltage to the data driver according to the compensated source high potential voltage Vout. Accordingly, the data voltage is adjusted according to the voltage drop amount so that the luminance difference according to the voltage drop can be compensated and the pixel driving stability can be improved without affecting the high potential voltage which is supplied to the pixel.

A display device according to an example embodiment of the present disclosure includes a display panel in which a plurality of pixels is disposed and a luminance compensating unit which adjusts a gamma voltage according to a difference of a first high potential voltage supplied to a pixel the most adjacent to one side of the display panel, among the plurality of pixels, and a second high potential voltage supplied to a pixel the most adjacent to the other side of the display panel, among the plurality of pixels.

According to aspects of the present disclosure, the luminance compensating unit can include a source high potential voltage compensating unit which outputs a source high potential voltage compensated according to a difference value of the first high potential voltage and the second high potential voltage and a gamma voltage generating unit which outputs a gamma voltage according to the compensated source high potential voltage.

According to aspects of the present disclosure, the source high potential voltage compensating unit can include a voltage drop amount amplifying unit which amplifies and outputs the difference value of the first high potential voltage and the second high potential voltage and a source high potential voltage amplifying unit which outputs the source high potential voltage compensated by adding the amplified difference value and the source high potential voltage.

According to aspects of the present disclosure, the voltage drop amount amplifying unit can include a first resistor connected to an inverting input terminal, a second resistor and a third resistor connected to a non-inverting input terminal and a first feedback resistor connected between an output terminal and the inverting input terminal.

According to aspects of the present disclosure, the source high potential voltage amplifying unit can include a fourth resistor connected to an inverting input terminal, a fifth resistor connected between an output terminal and a non-inverting input terminal of the voltage drop amount amplifying unit, a sixth resistor connected between the non-inverting input terminal and a line to which the source high potential voltage is supplied and a second feedback resistor connected between the output terminal and the inverting input terminal.

According to aspects of the present disclosure, the difference value output from the voltage drop amount amplifying unit can be input to a non-inverting input terminal of the source high potential voltage amplifying unit and the source high potential voltage can be input to the non-inverting input terminal of the source high potential voltage amplifying unit.

According to aspects of the present disclosure, the gamma voltage generating unit can include a first gamma voltage generating unit which outputs a gamma voltage of a red sub pixel according to the compensated source high potential voltage and a second gamma voltage generating unit which outputs gamma voltages of a green sub pixel and a blue sub pixel according to the compensated source high potential voltage.

According to aspects of the present disclosure, the display device can further include a first sensing line which is connected to the pixel the most adjacent to one side of the display panel, among the plurality of pixels, to transmit a supplied first high potential voltage to the luminance compensating unit and a second sensing line which is connected to the pixel the most adjacent to the other side of the display panel, among the plurality of pixels, to transmit a supplied second high potential voltage to the luminance compensating unit.

A display device according to another example embodiment of the present disclosure includes a display panel in which a plurality of pixels is disposed, a data driver which supplies a data voltage to the plurality of pixels through a plurality of data lines, according to a gamma voltage and a luminance compensating unit which adjusts the gamma voltage according to a difference of a first high potential voltage supplied to a pixel disposed in a first pixel line, among the plurality of pixels, and a second high potential voltage supplied to a pixel disposed in a last pixel line, among the plurality of pixels.

According to aspects of the present disclosure, the luminance compensating unit can include a first amplifying unit which amplifies and outputs a difference value of the first high potential voltage and the second high potential voltage, a second amplifying unit which outputs a compensated source high potential voltage obtained by adding the difference value and a source high potential voltage and a gamma voltage generating unit which supplies a gamma voltage to the data driver according to the compensated source high potential voltage.

According to aspects of the present disclosure, the difference value output from the first amplifying unit can be input to a non-inverting input terminal of the second amplifying unit and the source high potential voltage can be input to the non-inverting input terminal of the second amplifying unit.

According to aspects of the present disclosure, the gamma voltage generating unit can include a first gamma voltage generating unit which outputs a gamma voltage of a red sub pixel according to the compensated source high potential voltage and a second gamma voltage generating unit which outputs gamma voltages of a green sub pixel and a blue sub pixel according to the compensated source high potential voltage.

According to aspects of the present disclosure, the display device can further include a first sensing line which is connected to the pixel disposed in the first pixel line to transmit a supplied high potential voltage to the luminance compensating unit and a second sensing line which is connected to the pixel disposed in the last pixel line to transmit a supplied high potential voltage to the luminance compensating unit.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel including a plurality of pixels; and a luminance compensating unit configured to adjust a gamma voltage according to a difference value between a first high potential voltage and a second high potential voltage, the first high potential voltage being supplied to a pixel that is most adjacent to one side of the display panel, among the plurality of pixels, and the second high potential voltage being supplied to a pixel that is most adjacent to another side of the display panel, among the plurality of pixels, wherein the luminance compensating unit is configured to receive the first high potential voltage from the pixel most adjacent to one side of the display panel, and to receive the second high potential voltage from the pixel most adjacent to the other side of the display panel, wherein the luminance compensating unit includes:

a source high potential voltage compensating unit configured to output a source high potential voltage compensated according to the difference value between the first high potential voltage and the second high potential voltage; and a gamma voltage generating unit configured to output a gamma voltage according to the compensated source high potential voltage, wherein the source high potential voltage compensating unit includes:

a voltage drop amount amplifying unit configured to amplify and output the difference value between the first high potential voltage and the second high potential voltage; and a source high potential voltage amplifying unit configured to output the source high potential voltage compensated by adding the amplified difference value and the source high potential voltage, and wherein the amplified difference value output from the voltage drop amount amplifying unit is input to a non-inverting input terminal of the source high potential voltage amplifying unit, and the source high potential voltage is input to the non-inverting input terminal of the source high potential voltage amplifying unit.

2. The display device according to claim 1, wherein the voltage drop amount amplifying unit includes:

an inverting input terminal;

a non-inverting input terminal;

an output terminal;

a first resistor connected to the inverting input terminal;

a second resistor and a third resistor connected to the non-inverting input terminal; and a first feedback resistor connected between the output terminal and the inverting input terminal.

3. The display device according to claim 1, wherein the source high potential voltage amplifying unit includes:

an inverting input terminal;

a non-inverting input terminal;

an output terminal;

a fourth resistor connected to the inverting input terminal;

a fifth resistor connected between an output terminal of the voltage drop amount amplifying unit and the non-inverting input terminal;

a sixth resistor connected between the non-inverting input terminal and a line to which the source high potential voltage is supplied; and a second feedback resistor connected between the output terminal of the source high potential voltage amplifying unit and the inverting input terminal.

4. The display device according to claim 1, wherein the gamma voltage generating unit includes:

a first gamma voltage generating unit configured to output a gamma voltage of a red sub pixel according to the compensated source high potential voltage; and a second gamma voltage generating unit configured to output gamma voltages of a green sub pixel and a blue sub pixel according to the compensated source high potential voltage.

5. The display device according to claim 1, further comprising:

a first sensing line connected to the pixel that is most adjacent to the one side of the display panel, and configured to transmit a supplied first high potential voltage to the luminance compensating unit; and a second sensing line connected to the pixel that is most adjacent to the another side of the display panel, and configured to transmit a supplied second high potential voltage to the luminance compensating unit.

6. The display device according to claim 1, further comprising a metal pattern including a high potential voltage line, wherein the first high potential voltage is measured at a first location of the high potential voltage line, the first location being a location of the pixel most adjacent to one side of the display panel, wherein the second high potential voltage is measured at a second location of the high potential voltage line, the second location being a location of the pixel most adjacent to the other side of the display panel, and wherein the difference value between the first high potential voltage and the second high potential voltage occurs due to a resistance on the high potential voltage line between the pixel most adjacent to one side of the display panel and the pixel most adjacent to the other side of the display panel.

7. The display device according to claim 6, wherein each pixel includes:

a light emitting diode including a first electrode connected to the high potential voltage line; and a drive transistor connected to a second electrode of the light emitting diode and configured to control a driving current supplied to the light emitting diode in accordance with a data voltage supplied by a data driver.

8. A display device, comprising:

a display panel including a plurality of pixels;

a data driver configured to supply a data voltage to the plurality of pixels through a plurality of data lines, according to a gamma voltage; and a luminance compensating unit configured to adjust the gamma voltage according to a difference value between a first high potential voltage and a second high potential voltage, the first high potential voltage being supplied to a pixel disposed in a first pixel line, among the plurality of pixels, and the second high potential voltage being supplied to a pixel disposed in a last pixel line, among the plurality of pixels, wherein the luminance compensating unit is configured to receive the first high potential voltage from the pixel disposed in the first pixel line, and to receive the second high potential voltage from the pixel disposed in the last pixel line, wherein the luminance compensating unit includes:

a first amplifying unit configured to amplify and output the difference value between the first high potential voltage and the second high potential voltage;

a second amplifying unit configured to output a compensated source high potential voltage obtained by adding the difference value and a source high potential voltage; and a gamma voltage generating unit configured to supply a gamma voltage to the data driver according to the compensated source high potential voltage, and wherein the amplified difference value output from the first amplifying unit is input to a non-inverting input terminal of the second amplifying unit, and the source high potential voltage is input to the non-inverting input terminal of the second amplifying unit.

9. The display device according to claim 8, wherein the gamma voltage generating unit includes:

a first gamma voltage generating unit configured to output a gamma voltage of a red sub pixel according to the compensated source high potential voltage; and a second gamma voltage generating unit configured to output gamma voltages of a green sub pixel and a blue sub pixel according to the compensated source high potential voltage.

10. The display device according to claim 8, further comprising:

a first sensing line connected to the pixel disposed in the first pixel line to transmit a supplied high potential voltage to the luminance compensating unit; and a second sensing line connected to the pixel disposed in the last pixel line to transmit a supplied high potential voltage to the luminance compensating unit.

* * * * *